United States Patent Office 2,842,446
Patented July 8, 1958

2,842,446

HIGH-INDEX GLASS ELEMENTS

Warren R. Beck, Mahtomedi, and Nelson W. Taylor, Afton Township, Washington County, Minn., assignors to Minnesota Mining & Manufacturing Company, St. Paul, Minn., a corporation of Delaware No Drawing. Application December 27, 1954
Serial No. 477,926

4 Claims. (Cl. 106—47)

This invention relates to new and useful, transparent, high-refractive-index, glass elements, such as glass beads, fibers, flakes and thin plates. The glass elements of this invention have especially high-refractive indices, i. e., above 2.4 and up to approximately 2.51, and have a thickness generally not exceeding approximately 1 millimeter. They are very resistant chemically, are durable, and are resistant to weathering action.

Small glass beads of this invention are especially useful as sphere-lens optical elements in the manufacture of reflex-reflecting products of the type described in U. S. Patent No. 2,407,680 (September 17, 1946). Glass beads for this usage have a diameter which may range from less than one mil up to about ten mils. The reflector products made according to the referenced patent are used in making highway and vehicle signs and markers which are exposed outdoors to sunlight over a period of many months; hence the beads must be non-solarizing, that is, must not darken to an objectionable extent when exposed out of doors for extended periods. Glass beads used in making these reflector products also must be highly resistant to leaching, crazing, or other deterioration occasioned by prolonged or repeated contact with rain water, or by freezing and thawing. The beads must be formed from glass compositions which melt to a free-flowing state, since the molten particles of glass must form themselves into spheres by the surface tension effect operating during the available brief time interval in the manufacturing process. The beads should be homogeneous and transparent, and have a nearly perfect sphericity, in order to function properly as sphere-lenses. Glass beads of this invention satisfy the foregoing requirements and, in addition, possess extraordinarily high-refractive indices.

The small size of the beads can be appreciated from the fact that there are billions in a mass thereof occupying a cubic foot of volume, and that a layer of beads contains many thousands per square inch.

The beads hereof can be made by a process involving blowing or dropping particles of the glass in cullet form through a high-temperature flame or a radiant heating zone wherein they are fused and softened sufficiently so as to form transparent spheres by surface tension effects operating while they are free-falling. Rapid cooling is then accomplished while the molten particles are still freely falling so as to harden the spheres without devitrification taking place. The glass cullet can be made by quenching a stream of the molten glass in water. In the alternative, beads can also be formed directly from a batch of the molten glass.

Fibers can be made by jet-blowing a stream of molten glass. Filaments can be drawn from molten glass through a die, followed by rapid cooling. Thin plates and flakes of glass can be made by casting a thin layer of molten glass on a cold steel surface. Small jewelry "gems" can be made from pieces of our glass. The high-refractive-index and high optical dispersion results in high surface sparkle and high internal light reflection.

Our glasses lie outside the field of high-index optical glasses as ordinarily conceived. Common high-index optical glasses, as the term is ordinarily used, have refractive indices only approaching approximately 2.0. Our glass beads are not made from ordinary optical glasses but from novel compositions which would not be regarded as "optical glasses" by glass technologists since they cannot be used for the purposes which a glass technologist has in mind when he uses the term "optical glass" (namely, glasses useful for making high quality lenses and prisms for optical insruments such as cameras, projectors, microscopes, telescopes, periscopes, binoculars, spectacles, etc.). The manufacture of glass elements for such optical insruments generally requires the making of glass blanks of substantial size and thickness. The necessary pieces of solid glass must be formed from molten glass without devitrification taking place during the cooling of the glass. The larger the piece of glass, the slower the cooling that is required to avoid excessive mechanical and optical strains. The slower the cooling, the greater the tendency to devitrify. Hence glass formulations must be employed which will not result in devitrification in making the sizable pieces of glass that are to be finished in manufacturing the final optical elements, such as lenses and prisms.

Our glass compositions are of such a nature that they cannot be employed in making optical elements of the usual sizes and shapes. They have a strong devitrification tendency owing to the necessity of avoiding ingredients that would lower the refractive index below the desired value.

Formerly attempts to gain high-index glass elements have been directed to the use of a variety of inorganic constituents to obtain suitable balances of required properties. The unusual discovery of this invention is that transparent small glass elements possessing extraordinarily high-refractive-indices in combination with other required properties can be made from titanium dioxide and lead oxide alone. No other inorganic constituent is necessary. By using these two components and by keeping titanium dioxide within the range of 15 to 50 weight percent and lead oxide within the range of 85 to 50 weight percent, we obtain glass elements having such high indices of refraction as above 2.4, and in addition, having the transparency and resistance to weathering required of small glass beads for highway signs and markers.

Other constituents, however, may be present in our glass elements to a small extent where slightly lower refractive indices, or a slight reduction in other desired properties, may be tolerated. For example, small amounts, or traces, of the oxides of tin, zinc, cadmium, antimony, bismuth, chromium, zirconium, silicon, boron, phosphorous, sodium, germanium, iron, arsenic, silver, etc., may be tolerated in our essentially two component glass compositions without greatly upsetting the balance of properties exhibited thereby. Some of these oxides are sometimes present as minor impurities in the starting materials, e. g., titanium oxide and lead oxide. Others sometimes find their way into our glass compositions during the process of manufacture thereof. For example, during the melting of the oxides of titanium and lead in refractory crucibles, very small amounts of less refractory oxides sometimes dissolve from the composition of the crucible itself into the glass making charge. Certain of these oxides may color our glass elements slightly. Generally, all reasonable precautions will be taken to avoid more than trace amounts of such adulterating constituents. Our glass composition can therefore accurately be described as substantially completely consisting of titanium oxide and lead oxide.

The most preferred glass elements of this invention are those having from between 25 to 40 weight percent of titanium dioxide and from between 75 to 60 weight percent of lead oxide. These preferred glass elements are clear, transparent, are essentially free of any yellow hue (a factor not true with some of the compositions outside this more limited range but within the broad range of our invention), and are not excessively refractory (which is a factor limiting the ease of manufacture of some of the glass elements of our broad invention having amounts of titanium dioxide near the upper operable limit). Glass elements having a compositional analysis within our preferred ranges are also very resistant to deterioration by chemicals and weathering such as sunlight and repeated water immersion and drying action. That glass elements may be made having these extremely desirable properties becomes even the more surprising when it is realized that they may be manufactured at a cost amounting to but a fraction of that previously incurred in the commercial manufacture of high-refractive-index glass beads for reflex reflector surfaces. Yet, out of these particularly economical raw materials, glass beads having an especially desirable balance of required properties are obtained.

In accordance with general practice, our glass compositions are given in terms of the weight percent of the oxide constituents presumptively present in the finished glass, based upon the proportions of oxide-forming constituents known to be present in the making of the glass or as determined by analysis. As is generally known, constituents other than those present in our final glass articles may be present in the original glass making charge, the amounts of beginning constituents being adjusted to give the proper compositional analysis in the resulting product. For example, while titanium is most conveniently added in the form of $TiO_2$, various compounds such as litharge, red lead, lead nitrate, etc. may be used to provide the PbO component.

Starting ingredients are mixed together in powder form (including cullet from previous runs when available) and melted in a highly refractory vessel such as, for example, one of platinum or alumina. Other refractory vessels may be employed in the manufacture of the glass but the use of vessels less refractory than alumina will ordinarily be avoided. The melting temperature of our compositions is in the range of 1000° C. to 1400° C.

The following table illustrates the compositional analysis in weight percent of glass elements made according to this invention.

Table 1

| Composition Number | $TiO_2$ | PbO | Impurities | Refractive Index |
|---|---|---|---|---|
| 1 | 15 | 85 | | 2.51 |
| 2 | 18.2 | 81 | $0.8Al_2O_3$ | 2.49 |
| 3 | 19.3 | 80.7 | | 2.50 |
| 4 | 20 | 80 | | 2.50 |
| 5 | 26.4 | 73.6 | | 2.50 |
| 6 | 30 | 70 | | 2.49 |
| 7 | 32.3 | 67.7 | | 2.49 |
| 8 | 36 | 63.2 | $0.8ZrO_2$ | 2.48 |
| 9 | 37.5 | 62.5 | | 2.49 |
| 10 | 40 | 60 | | 2.49 |
| 11 | 41.8 | 58.2 | | 2.49 |
| 12 | 48 | 52 | | 2.48 |

We claim:

1. Transparent glass elements highly resistant to deterioration by chemicals and weathering action and formed from glass characterized by having a refractive index above 2.4, said elements having a thickness not exceeding 1 millimeter and substantially completely consisting of between 15 and 50 weight percent titanium dioxide and between 85 and 50 weight percent lead oxide.

2. Transparent glass elements highly resistant to deterioration by chemicals and weathering action and formed from glass characterized by having a refractive index above 2.4, said elements having a thickness not exceeding 1 millimeter and substantially completely consisting of between 25 and 40 weight percent titanium dioxide and between 75 and 60 weight percent lead oxide.

3. Transparent glass beads highly resistant to deterioration by chemicals and weathering action and formed from glass characterized by having a refractive index above 2.4, said beads having a diameter not exceeding 10 mils and substantially completely consisting of between 15 and 50 weight percent titanium dioxide and between 85 and 50 weight percent lead oxide.

4. Transparent glass beads highly resistant to deterioration by chemicals and weathering action and formed from glass characterized by having a refractive index above 2.4, said beads having a diameter not exceeding 10 mils and substantially completely consisting of between 25 to 40 weight percent titanium dioxide and between 75 to 60 weight percent lead oxide.

References Cited in the file of this patent
UNITED STATES PATENTS 2,472,447    Kuan-Han Sun _____ June 7, 1949

OTHER REFERENCES

Page 150 (Fig. 404) of the publication entitled Phase Diagrams for Ceramists, by Ernest M. Levin et al., published by the American Ceramic Society Inc. (1956).

Minnesota Mining & Mfg. Co., 153,066, Sept. 2, 1953 (Australian), 14 cols.